United States Patent Office 3,343,894
Patented Sept. 26, 1967

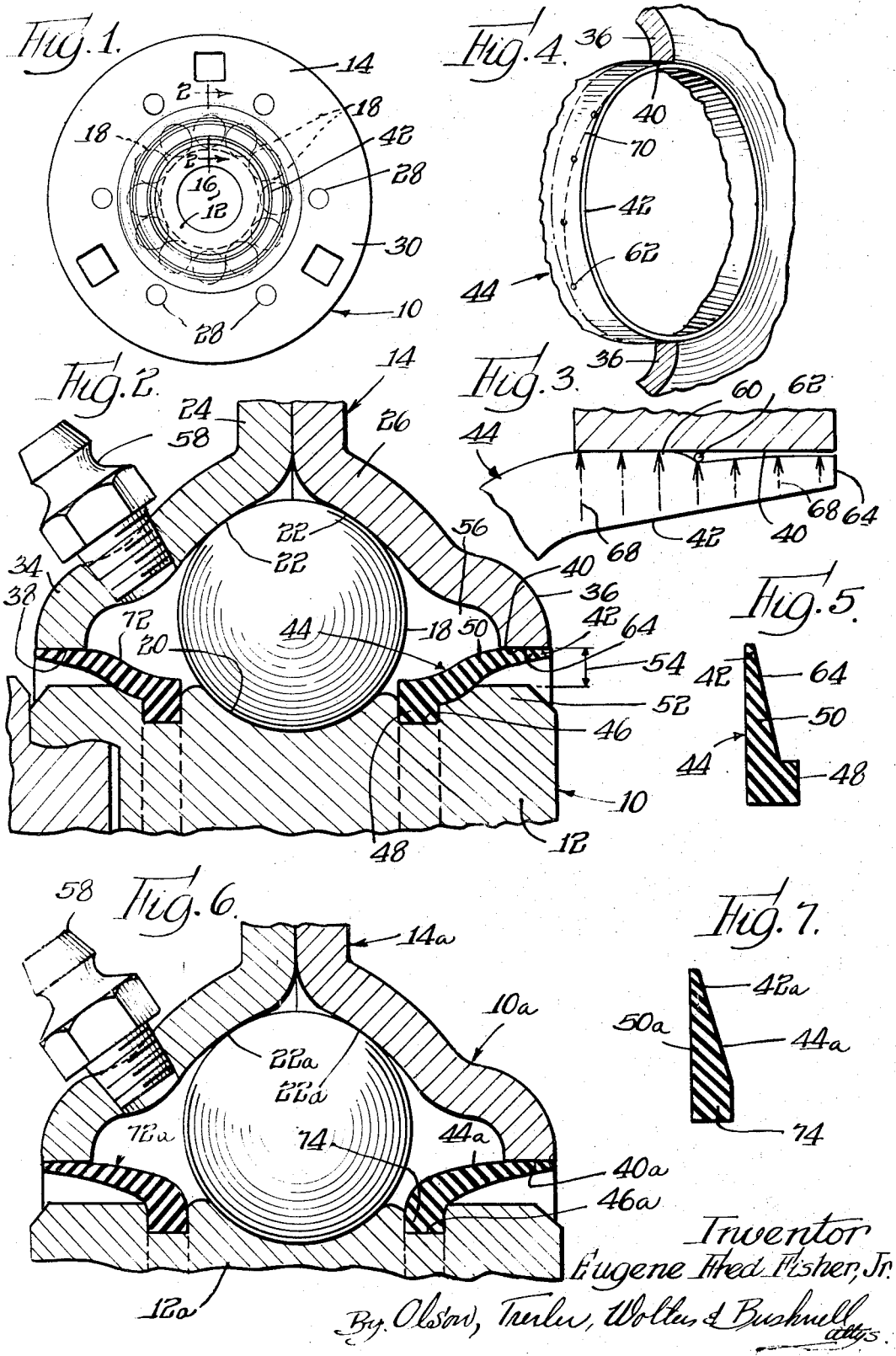

3,343,894
SEALED BEARING
Eugene Fred Fisher, Jr., Northbrook, Ill., assignor to Textron Inc., Providence, R.I., a corporation of Rhode Island
Filed Oct. 19, 1965, Ser. No. 497,627
5 Claims. (Cl. 308—187.2)

The present invention relates to bearings sealed to contain lubricant and to exclude dirt and other contaminants from inner bearing space wherein load bearing surfaces are exposed. The invention is concerned particularly with bearings in which two bearing members mutually journalled in concentric relation to each other are rotatably sealed to each other by a flexible annular seal supported on one of the bearing members and cantilevering into slidable sealing engagement with an annular sealing surface on the other bearing member. In the prior art a sealed bearing of the type to which the invention relates is disclosed in United States Patent No. 2,823,967, issued Feb. 18, 1958, to Richard F. Harrington.

Such bearings are commonly used in agricultural machinery and in other equipment used in "dirty" environments wherein the bearings are exposed to dirt and other contaminants, which for convenience will be referred to generally as "dirt."

When used in agricultural machinery, for example, the cantilevering flexible annular seal of a bearing of the type to which this invention relates is subject to being temporarily moved away from the opposing seal surface of the bearing by external forces, with the result that dirt particles or other contaminants may gain entrance to the interface between the annular seal and the opposing seal surface, to disrupt the normal effectiveness of the bearing seal and possibly allow contaminants to gain entrance to the grease space within the bearing.

One object of the invention is to provide a sealed bearing of the character referred to having a new and improved construction that is very economical to manufacture yet, at the same time, exceptionally effective in keeping the bearing internally clean and free of contaminants even in dirty environments.

A more specific object of the invention is to provide a sealed bearing of the character recited having a new and improved construction that causes any contaminants, that may gain entrance to the interface between the cantilevering flexible bearing seal and the opposing sealing surface, to be expelled outwardly as an incident to relative rotation of the mutually journalled bearing members.

Another object is to provide for use in dirty environments a low cost bearing having a new and advantageous construction that establishes between a cantilevering, flexible bearing seal and an opposing sealing surface of substantial width a sealing pressure force that progressively decreases in an outward direction to produce, as an incident to normal dynamic operation of the bearing, an inherent action that expels outwardly contaminants that may gain entrance to the interface between the cantilevering flexible seal and the opposing sealing surface.

Other objects and advantages will become apparent from the following description of the exemplary forms of the invention illustrated in the drawings, in which:

FIGURE 1 is an end view of an antifriction bearing constructed in accordance with the invention;

FIG. 2 is a fragmentary radial sectional view on a much enlarged scale taken along the line 2—2 of FIG. 1;

FIG. 3 is a fragmentary radial sectional view on a still larger scale, showing a dirt particle intervening between the cantilevering marginal edge of the flexible annular seal and the opposing sealing surface of the bearing and illustrating graphically the pressure forces urging the marginal edge of the seal against the sealing surface;

FIG. 4 is a fragmentary perspective view of the cantilevering annular seal and a coacting portion of the encircling bearing member which is broken away to reveal a graphic illustration of the path of expulsion of a contaminant particle;

FIG. 5 is a radial sectional view of the flexible bearing seal showing the seal as it is initially formed before being assembled into the bearing;

FIG. 6 is a radial sectional view similar to FIG. 2 but showing a modified form of the bearing constructed in accordance with the invention; and FIG. 7 is a fragmentary radial sectional view similar to FIG. 5 but showing the flexible cantilevering seal of the modified bearing of FIG. 6.

Having reference to the drawings, the preferred embodiment of the invention illustrated is an antifriction bearing 10 of the type that has proven both from the standpoint of manufacturing economy and serviceability to be highly advantageous in the construction and use of agricultural machinery and other equipment used in dirty environments.

The bearing 10 comprises an inner annular bearing member 12 adapted to be mounted on a support shaft or the like (not shown) and an outer annular bearing member 14 adapted to be affixed to coacting machine structure (not shown). The inner and outer bearing members 12, 14 are mutually journalled in concentric relation to each other for relative rotation about a common axis 16, FIG. 1, by means of an annular series of rotatable load bearing elements 18, having rolling engagement with both the inner and outer bearing members 12, 14.

As shown, the load bearing elements 18 are formed by an annular series of bearing balls having rolling engagement with an inner bearing race 20 formed in the inner bearing member 12, and with an outer bearing race 22 formed by the outer bearing member 14.

The outer bearing member 14 is fashioned in the preferred construction shown from two sheet metal stampings 24, 26, FIG. 2, turned back to back and secured together outwardly of the race 22 by an annular series of rivets 28.

Outwardly of the outer race 22, the two half sections 24, 26 of the member 14 form in the construction illustrated an annular mounting flange 30, FIG. 1, on the bearing member 14. Inwardly of the rivets 28, the two half sections 24, 26 of the outer bearing member 14 curve away from each other to form annular half sections of the outer ball race 22.

Inwardly of the outer race 22, the two half sections 24, 26 of the bearing member 14 are shaped to extend axially outward from the balls 18 and are turned radially inward, as shown in FIG. 2, to form two circular protective skirts 34, 36 extending around the inner bearing member 12 in a radially spaced relation to the inner bearing member 12.

The two protective skirts 34, 36 define respectively two annular sealing surfaces 38, 40, each having considerable width. Preferably, each sealing surface 38, 40 is cylindrical in shape and faces radially inward in radially spaced relation to adjacent portions of the inner bearing member 12.

For convenience in description, the structure provided on the right hand end of the bearing 10, with reference to FIG. 2, to seal the bearing on the corresponding side of the series of balls 18 will be described in detail. Sealing of the bearing on the opposite side of the series of balls 18 is effected by similar structure formed basically as a mirror image of that used on the right hand end or side of the bearing, with reference to FIG. 2.

The cylindrical sealing surface 40 is slidably engaged across substantially its full axial width by the cantilevering marginal edge 42 of a flexible anular seal 44 formed of a resilient polymeric material. Nitrile rubber, sold commercially under the trade name "Buna N," is a highly satisfactory structural material for formation of the annular seal 44.

As will be described, the resilient polymeric seal 44 is fashioned and assembled into the bearing so that the seal 44 cantilevers from the bearing member 12 into circumferential sliding engagement with the sealing surface 40 on the bearing member 14 in a manner such that the seal 44 has an induced residual stress within its own structure tending to urge the cantilevering marginal edge 42 of the seal into firm sealing engagement with the sealing surface 40.

The inner bearing member 12 is shaped to define a circumferential seal mounting groove 46, located adjacent the inner race 20 a substantial distance axially inward of the cylindrical sealing surface 42, as illustrated in FIG. 2. The groove 46 is shaped to receive and support a thick annular anchoring lug 48 forming an integral part of the annular seal 44 and constituting the marginal edge of the seal 44 most remote from the marginal edge 42 which cantilevers into sealing engagement with the sealing surface 40, as will presently appear.

As initially formed, the resilient seal 44 has an L-shape in radial section, as shown in FIG. 5, in which the annular lug 48 forms the short leg of the L and the previously mentioned marginal edge 42 remote from the lug 48 forms the terminal part of a longer leg 50 of the L. The longer leg 50 of the seal as initially formed is, as shown in FIG. 5, generally flat as formed, and the overall or outer diameter of the annular seal as formed very materially exceeds the diameter of the cylindrical sealing surface 40.

It may be noted, with reference to FIG. 2, that the inner bearing member 12 is constructed in one piece. The portion 52 of the bearing member 12 located axially outward of the groove 46 has an outer diameter exceeding the minimum diameter of the groove 46 but, at the same time, being sufficiently smaller than the diameter of the sealing surface 40 to provide between the sealing surface 40 and the bearing portion 52 a radial clearance 54, FIG. 2, that considerably exceeds the thickness of the seal marginal edge 42, and that is sufficient to permit the anchoring or support lug 48 and the adjoining portion of the seal 44 to be moved axially inward between the sealing surface 40 and the bearing portion 52 for assembly of the seal and placement of the lug 48 in the groove 46 after the inner and outer bearing members 12, 14 and the balls 18 are assembled together.

After being initially formed and as an incident to its assembly into the bearing 10, the seal 44 is twisted from its unstressed original shape, as shown in FIG. 5, to have the final shape shown in FIG. 2 in which the anchoring lug 48 is twisted through an angle of approximately ninety degrees, and the cantilevering marginal edge 42 of the seal is materially contracted in diameter by the encircling sealing surface 40 which, as previously indicated, is much smaller in diameter than the diameter of the marginal edge 42 of the seal 44 as the seal is initially fashioned.

The contraction in the diameter of the marginal edge 42 of the seal 44 and the twisting of the seal leg 50 out of its initially flat shape, all as an incident to placement of the seal 44 in the bearing 10, produces in the seal 44 assembled into the bearing a residual stress which continuously urges the marginal edge 42 of the seal into slidable sealing engagement with the cylindrical sealing surface 40.

As shown, the marginal edge 42 extends across the entire width of the sealing surface 40. While the cantilevering marginal edge 42 of the seal 44 is urged firmly against the seal surface 40 by the adjacent cantilevering portion of the seal leg 50, the force with which the marginal seal edge 42 is urged against the sealing edge 40 is nevertheless limited, and the marginal edge 42 is subjected to being moved by an external force away from the sealing surface 40. As a mater of fact, the radial clearance 54 between the cylindrical sealing surface 40 and the adjacent portion 52 of the inner bearing member 12 is made greater than the thickness of the marginal seal edge 42, as previously mentioned, to provide for inward radial movement of the marginal seal edge 42. The radial clearance thus provided on the radially inward side of the marginal seal edge 42 permits flexing of the cantilevering seal edge 42 to following the sealing surface 40, even though there may be some eccentricity in the position of the sealing surface 40 in relation to the support for the seal 44 on the inner bearing member 12. The provision for movement of the cantilevering marginal edge 42 of the seal 44 away from the sealing surface 40 allows any excessive quantity of lubricant which may be injected into the internal grease space 56 within the bearing through a grease fitting 58 to depress the seal 44 radially and escape between the sealing surface 40 and the cantilevering seal edge 42.

While the provision made for allowing the cantilevering seal edge 42 to move inwardly affords a number of advantages of the character recited, the cantilevering seal edge 42 is at the same time subject to being separated from the sealing surface 42 by an abnormal applied force, with the result that on some occasions particles of dirt or other solid material may gain access to the interface 60 between the sealing surface 40 and the seal edge 42. A typical foreign particle of dirt or other solid material 62 from the external environment which has gained access to the interface 60 between the sealing surface 40 and marginal seal edge 42 is illustrated in the enlarged fragmentary radial sectional view of FIG. 3.

At this point, it may be noted that external forces tending to temporarily move the seal edge 42 away from the seal surface 40 can be applied to the sealing edge 42 in any number of ways. Bearings used on agricultural machinery, for example, often come into contact with foliage which may engage the marginal seal edge 42 and swing it away from the sealing surface 40 temporarily.

In prior bearings of this character, solid particles which gained access to the interface between a sealing surface on the bearing and a cantilevering flexible seal often worked their way inwardly into the internal grease space within the bearing. The entry of contaminating materials into internal spaces within such prior bearings could and often did materially shorten the service life of the bearings by accelerating the wear of the bearings in use.

The improved bearing 10 embodying the invention is so constructed that contaminating materials, such for example as the solid particle 62, FIG. 3, which may gain access to the interface 60 between the sealing surface 40 and the marginal seal edge 42 are automatically expelled outwardly from between the sealing surface 40 and the seal edge 42 as an incident to normal operation of the bearing.

To achieve the desired outward expulsion of the solid particles and other contaminants from between the sealing surface 40 and the cantilevering marginal seal edge 42, the thickness of the marginal seal edge 42 is progressively reduced at a distinct and material rate in an outward direction across the width of the cylindrical sealing surface 40 against which the marginal edge 42 is urged to form a seal.

In the drawings, FIGS. 2, 3 and 5, the thickness of the marginal seal edge 42 is denoted by the number 64. More particularly, the thickness 64 of the marginal seal edge 42 is progressively reduced in an axially outward direction across the cylindrical sealing surface 40 to produce a marked and progressive decrease in an axially outward direction in the pressure force with which the marginal seal edge 42 is urged against the sealing surface 40.

The progressive decrease in an outward direction of the pressure of the seal edge 42 on the sealing surface 40 is illustrated graphically in FIG. 3, in which the pressure force of the cantilevering seal edge 42 on the sealing surface 40 is represented graphically by the vectors or arrows 68 spaced axially across the sealing surface 40, as shown, and having lengths generally proportional to the pressure force with which corresponding adjacent areas the cantilevering marginal edge 42 are urged against the sealing surface 40. As illustrated, the innermost vector or arrow 68 is the longest, and the outermost arrow 68 is the shortest, with the length of the individual arrows intervening between the innermost and outermost arrows decreasing progressively in an axially outward direction in conformity with the progressive decrease in an axially outward direction of the pressure force of the marginal edge 42 on the sealing surface 40, due to the progressive thinning at a substantial rate of the thickness 64 of the marginal edge 42 in an outward direction.

With the bearing 10 constructed in the manner described a would-be contaminating material, such for example as the solid particle 62 illustrated in FIG. 3, which may gain entrance to the interface 60 between the marginal edge 42 and the sealing surface 40 is automatically expelled in an outward direction from between the marginal seal edge 42 and the sealing surface 40, as an incident to sliding of the cantilevering seal edge 42 over the sealing surface 40 when the bearing is in dynamic operation.

As the cantilevering seal edge 42 slides over the sealing surface 40, a typical contaminant particle 62 intervening between the seal edge 42 and the sealing surface 40 is, by virtue of the described construction, caused to move along an outwardly spiraling path illustrated by the phantom line 70 shown in FIG. 4. As a matter of fact, the length of the arcuate path 70 through which a particle 62 travels in being expelled from between the seal edge 42 and the sealing surface 40 may extend over a number of revolutions of the progressively thinned, cantilevering seal edge 42 and sealing surface 40, but the path 70 of the particle 62, nevertheless, spirals outwardly until the particle is expelled back to the external environment, so that it does not gain entrance to the grease space 56 within the bearing. The result is a highly effective protection of the internal grease space 56 wtihin the bearing from contaminants which have in the operation of conventional bearings of this character been a source of difficulty in dirty environments which have subjected the cantilevering seals to forced displacement away from the coacting seal surfaces.

Having reference again to FIG. 2, the side of the bearing 10 opposite from the seal 44 is sealed by a cantilevering flexible annular seal 72, formed as a mirror image of the seal 44 and supported on the bearing member 12 to cooperate with the sealing surface 38 in the same manner that the seal 44 is formed and supported on the bearing member 12 to cooperate with the seal 40.

Components of the modified bearing 10a, illustrated in FIGS. 6 and 7, which are counterparts of components of the bearing 10 just described are identified by the same reference numbers with the addition of the suffix a.

As illustrated in FIG. 7 and in FIG. 6, the inner marginal edge or annular base 74 of the bearing seal 44a is a radially inward continuation of the seal leg 50a, so that the seal 44a as initially formed has a generally straight radial shape, as viewed in radial section, FIG. 7. Upon assembly of the seal 44a into the bearing, the base edge 74 fits into the groove 46a and the seal cantilevers into sealing engagement with the sealing surface 40a to provide the desired bearing sealing action, the cantilevering marginal edge 42a of the seal 44a being progressively thinned in an outward direction for this purpose. The seal 72a is a mirror image of the seal 44a.

It will be appreciated that the invention is not necessarily limited to use of the precise construction illustrated and described, but includes the use of variations of the illustrated construction within the spirit and scope of the invention as defined by the claims.

The invention is claimed as follows:

1. A sealed bearing comprising first and second bearing members journalled together for rotation in relation to each other about a common axis, said first bearing member defining thereon a cylindrical sealing surface of substantial width concentric with said axis, a flexible annular seal formed of a yieldable polymeric material and disposed in concentric relation to said axis, said flexible annular seal being supported on said second bearing member at an annular seal support position on the latter located axially inward of said sealing surface, said flexible annular seal cantilevering from said seal support position on said second bearing member and having a marginal edge cantilevering in an axially outward direction and slidably overlapping said sealing surface on said first bearing member, said flexible annular seal having a residual stress therein continuously urging said marginal edge of the seal against said sealing surface with substantial firmness to form a slidable seal with said sealing surface, and said cantilevering marginal edge of said flexible annular seal being shaped to have a thickness which decreases progressively from the inner edge toward the outer edge of said sealing surface that is slidably overlapped by the seal so that by virtue of the progressive decrease in an outward direction in the thickness of said marginal seal edge the pressure force exerted by the seal on the sealing surface progressively decreases from the inner edge toward the outer edge of the sealing surface to effect as an incident to rotation of said bearing members relative to each other outward expulsion from between said sealing surface and said marginal seal edge any solid particles intervening therebetween.

2. A sealed bearing comprising first and second bearing members journalled together for rotation in relation to each other about a common axis, said first bearing member defining thereon an annular sealing surface concentric with said axis and having substantial width, a flexible annular seal formed of a yieldable polymeric material and secured to said second bearing member in concentric relation to said axis, said flexible annular seal cantilevering from said second bearing member and having a cantilevering marginal edge slidably overlapping said sealing surface on said first bearing member, said flexible annular seal being stressed to urge said marginal edge thereof against said sealing surface with substantial firmness to form a slidable seal with said sealing surface, and said cantilevering marginal edge of said flexible annular seal being shaped to have a thickness which decreases progressively from the inner edge toward the outer edge of said sealing surface that is slidably overlapped by the seal so that by virtue of the progressive decrease in an outward direction in the thickness of said marginal seal edge the pressure force exerted by the seal on the sealing surface progressively decreases from the inner edge toward the outer edge of the sealing surface so that upon rotation of the bearing members relative to each other any contaminating material intervening between said sealing surface and said cantilevering seal edge is expelled in an outward direction by said sealing surface and said seal working together.

3. A sealed antifriction bearing comprising first and second bearing members defining inner and outer bearing races, rotary load bearing elements intervening between said races in rolling engagement therewith to mutually journal said bearing members for rotation in relation to each other about a common axis, said first bearing member defining thereon an annular sealing surface concentric with said axis and having substantial width, said second bearing member defining therein an annular groove concentric with said axis and located a substantial distance axially inward of said sealing surface, a flexible annular seal formed of a yieldable polymeric material and having an annular base portion fitted into said groove to anchor and support said seal on said second bearing member, said flexible annular seal cantilevering from said second bearing member and having a marginal edge cantilevering axially outward from said groove into slidable overlapping relation to said sealing surface on said first bearing member, said annular seal having a residual stress therein urging said marginal edge thereof against said sealing surface with substantial firmness to form a slidable seal with said sealing surface, and said cantilevering marginal edge of said flexible annular seal being shaped to have a thickness which decreases progressively from the inner edge toward the outer edge of said sealing surface that is slidably overlapped by the seal so that by virtue of the progressive decrease in an outward direction in the thickness of said marginal seal edge the pressure force exerted by the seal on the sealing surface progressively decreases from the inner edge toward the outer edge of the sealing surface whereupon said sealing surface and said seal produce as an incident to rotation of said bearing members relative to each other outward expulsion from between said sealing surface and said marginal seal edge any solid particles intervening therebetween.

4. A sealed bearing comprising inner and outer bearing members journalled together for rotation in relation to each other about a common axis, said outer bearing member defining thereon an annular sealing surface concentric with said axis and having substantial width, a flexible annular seal formed of a yieldable polymeric material and having in its unstressed condition a generally flat form and having an outer marginal edge that materially exceeds in diameter the diameter of said sealing surface, said annular seal having a base portion thereof supported on said inner bearing member a substantial distance axially inward of said sealing surface, said outer marginal edge of said seal cantilevering axially outward into slidable overlapping relation to said sealing surface so that said marginal seal edge is encircled and contracted in diameter by said sealing surface producing in said seal and said marginal edge thereof a residual stress continuously urging said marginal edge against said sealing surface with substantial firmness to form a slidable seal with said sealing surface, and said cantilevering marginal edge of said flexible annular seal being shaped to have a thickness which decreases progressively from the inner edge toward the outer edge of said sealing surface that is slidably overlapped by the seal so that by virtue of the progressive decrease in an outward direction in the thickness of said marginal seal edge the pressure force exerted by the seal on the sealing surface progressively decreases from the inner edge toward the outer edge of the sealing surface so that upon rotation of the bearing members relative to each other any solid particles intervening between said sealing surface and said cantilevering seal edge are expelled in an outward direction by said sealing surface and said seal working together.

5. A sealed antifriction bearing comprising inner and outer bearing members defining inner and outer bearing races, rotary load bearing elements intervening between said races in rolling engagement therewith to mutually journal said bearing members for rotation in relation to each other about a common axis, said outer bearing member defining thereon a concave cylindrical sealing surface concentric with said axis and having substantial width, said inner bearing member defining therein an annular seal receiver concentric with said axis, a flexible annular seal formed of a yieldable polymeric material and having an annular base portion fitted into said seal receiver to anchor and support said seal on said inner bearing member; said seal having opposite from said base portion thereof a marginal edge which has, before the shape of the seal is distorted by externally applied stress, a generally flat shape and an outer diameter which materially exceeds the diameter of said sealing surface; said marginal seal edge cantilevering from said base portion of the seal into slidable overlapping relation to said sealing surface so that said marginal edge is encircled and contracted in diameter by said sealing surface producing in the seal and said marginal edge thereof a residual stress urging said marginal seal edge against said sealing surface with substantial firmness to form a slidable seal with said sealing surface, and said cantilevering marginal edge of said flexible annular seal being shaped to have a thickness which decreases prorgessively from the inner edge toward the outer edge of said sealing surface that is slidably overlapped by the seal so that by virtue of the progressive decrease in an outward direction in the thickness of said marginal seal edge the pressure force exerted by the seal on the sealing surface progressively decreases from the inner edge toward the outer edge of the sealing surface whereupon said sealing surface and said seal produce as an incident to rotation of said bearing members relative to each other outward expulsion from between said sealing surface and said marginal seal edge any contaminating material intervening therebetween.

References Cited
UNITED STATES PATENTS

| | | | |
|---|---|---|---|
| 1,884,965 | 10/1932 | Baggett et al. | 308—8.2 |
| 2,823,967 | 2/1958 | Harrington | 308—187.2 |
| 2,945,730 | 7/1960 | Murray et al. | 308—187.2 |
| 2,991,514 | 7/1961 | Cotchett | 308—187.1 X |

FOREIGN PATENTS

| | | |
|---|---|---|
| 1,264,632 | 5/1961 | France. |

MARTIN P. SCHWADRON, *Primary Examiner.*

ROBERT A. DUA, *Examiner.*